(12) United States Patent
Hartmann

(10) Patent No.: US 6,189,893 B1
(45) Date of Patent: *Feb. 20, 2001

(54) PISTON RING

(75) Inventor: Uwe Hartmann, Barsinghausen (DE)

(73) Assignee: Sealed Power Europe GmbH, Barsinghausen (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/038,177

(22) Filed: Mar. 10, 1998

(30) Foreign Application Priority Data

Mar. 12, 1997 (DE) .................................. 97 104 128

(51) Int. Cl.$^7$ ........................................ F16J 9/26
(52) U.S. Cl. ................................. 277/443; 277/459
(58) Field of Search ....................... 277/443, 459, 277/460, 461, 440, 442, 941

(56) References Cited

U.S. PATENT DOCUMENTS

| | | | | |
|---|---|---|---|---|
| 1,385,613 | * | 7/1921 | Gill | 277/461 |
| 1,426,694 | * | 8/1922 | Weidenfeller | 277/461 X |
| 2,042,820 | * | 6/1936 | Bax | 277/461 |
| 3,414,277 | * | 12/1968 | Schmidt | 277/459 |
| 4,438,937 | | 3/1984 | Moriarty . | |

FOREIGN PATENT DOCUMENTS

| | | |
|---|---|---|
| 3538978 | 4/1987 | (DE) . |
| 3934795 | 6/1991 | (DE) . |
| 2699600 | 6/1994 | (FR) . |

\* cited by examiner

Primary Examiner—Anthony Knight
Assistant Examiner—Karlena D Schwing
(74) Attorney, Agent, or Firm—Collard & Roe, P.C.

(57) ABSTRACT

A nitrated piston ring for the piston of an internal combustion engine. The piston ring has a circumferential indentation in its flank surface facing away from the combustion pressure. This indentation has a depth of a few $\mu m$ and receives lubrication to prevent plating of aluminum from the aluminum piston on the flank surface of the piston ring.

5 Claims, 2 Drawing Sheets

PISTON RING

BACKGROUND OF THE INVENTION

1. Field of the Invention

This invention relates to a piston ring for internal combustion engines. In particular, the invention relates to a piston ring that prevents aluminum plating on the flank surfaces of the piston ring when used in conjunction with aluminum pistons.

2. The Prior Art

Piston rings for internal combustion engines must satisfy three requirements: First, they must seal the combustion chamber against the crankcase. Second, they must limit the consumption of oil, and third, they must dissipate the heat absorbed by the bottom of the cylinder into and through the wall of the cylinder and into the coolant.

The piston ring can seal the combustion chamber only if a continuous line of contact permanently exists between the surface of the cylinder and the running surface of the ring, except for the point of play of the joint. In addition one of the two flank surfaces of the piston must abut the corresponding surface of the piston-ring groove in an air- or gas-tight manner. This is accomplished if the piston ring is compressed against the cylinder wall by the action of the gas forces developed by the build-up of pressure between the inner jacket surface of the ring and the bottom of the groove. The piston rings are seated in the piston-ring groove with very little play. However, they are capable of performing axial, radial and rotary motions and tilting in the groove. Such movements are caused by the forces of inertia acting as a result of the piston movements, and by the combustion pressure. This may cause the flanks of the ring to wear and erode.

Many different kinds of piston ring materials are used in modern high-performance engines. These materials are subjected to various surface treatments and hardening methods in order to counteract the wearing phenomena. A common application for minimizing wear at low cost is the use of piston rings that have been nitrated on all sides. The basic material may be a steel with a high chromium content, or cast metal. These piston rings have the drawback that when they are used with aluminum pistons, they tend to cause plating with the aluminum. This plating occurs mainly on the lower of the piston ring flank surfaces, i.e., on the surface facing away from the combustion pressure. In addition, temperature and prevailing lack of lubricant has a significant effect, especially on the uppermost compression ring.

German Patent DE 35 38 978 C1 discloses a method for reducing static friction of a piston ring in the piston ring groove. This method involves relieving the pressure on the lower flank of the piston ring by guiding the gas pressure through bores or channels into a flute in the lower piston ring side surface. U.S. Pat. No. 4,438,937 and French Patent No. 2 699 600 both disclose measures for inertia reduction and weight relief through recesses in the side surface of the piston ring. However, these prior methods have the drawbacks that they require costly additional work and do not eliminate the risk of aluminum plating, especially in connection with large diesel engines that use aluminum pistons.

Cast metal piston rings have open graphite lamellae on their flank surfaces. A lubricating effect is achieved in this way so the problem of plating or microfusion occurs less often on piston rings made of cast metal.

In order to prevent plating on piston rings employed in Otto engines, the flank surfaces are often provided with various break-in coatings. For example, German patent DE 35 02 143 C3 shows break-in coatings made from manganese phosphate, zinc phosphate or tri-iron-tetraoxide ($Fe_3O_4$) for nitrated steel piston rings. The outermost layer, which is referred to as the composite layer, is removed, and one of the oxide layers is directly applied to the diffusion layer disposed underneath. This, however, requires additional work since the composite layer to be removed is extremely hard due to the iron nitrate formed therein.

Substantially higher combustion pressures develop in Diesel engines than in Otto engines, which increases the wear on the flank surfaces of the piston ring. For this reason, a ring carrier is installed to prevent groove wear, especially with aluminum pistons used in diesel engines. This ring carrier usually consists of austenitic cast iron. While this procedure avoids aluminum plating, it is very expensive.

Attempts have been made to avoid aluminum plating through the use of controlled surface roughness. However, the effectiveness of this procedure has not been reliably determined. The rings are manufactured with plateaus projecting from the surface of the flank in order to form a lubricant reservoir. However, rough wear will nonetheless occur, which will then impermissibly change the piston ring groove through abrasion.

SUMMARY OF THE INVENTION

It is therefore an object of the invention to create a piston ring that safely prevents plating of aluminum, which is also known as microfusion, on the flank surfaces of the piston ring.

It is another object of the invention to provide a piston ring that is inexpensive to manufacture.

These and other objects are accomplished by a piston ring that has a circumferential deepening or indentation on the flank surface facing away from the combustion pressure. When viewed in cross-section, the flank surface appears to be concave. Lubricant is received in the indentation, and aluminum plating is thus prevented. A lubricant reservoir can also develop in this indentation, so that the piston ring is cushioned when stressed by shocks and not subjected to full friction with the piston ring groove of the aluminum piston.

Engine tests have shown that only very minor aluminum plating develops, which automatically separates. It is also possible that no aluminum plating develops with the piston ring according to the invention. To the extent required, circumferential indentations can be made on both flank surfaces. Preferably, the indentation is from 0.5 to 5 µm and most preferably from about 2 to 3 µm extending all around in about the center of the surface of the piston ring flanks. The indentation may also be divided into segments.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
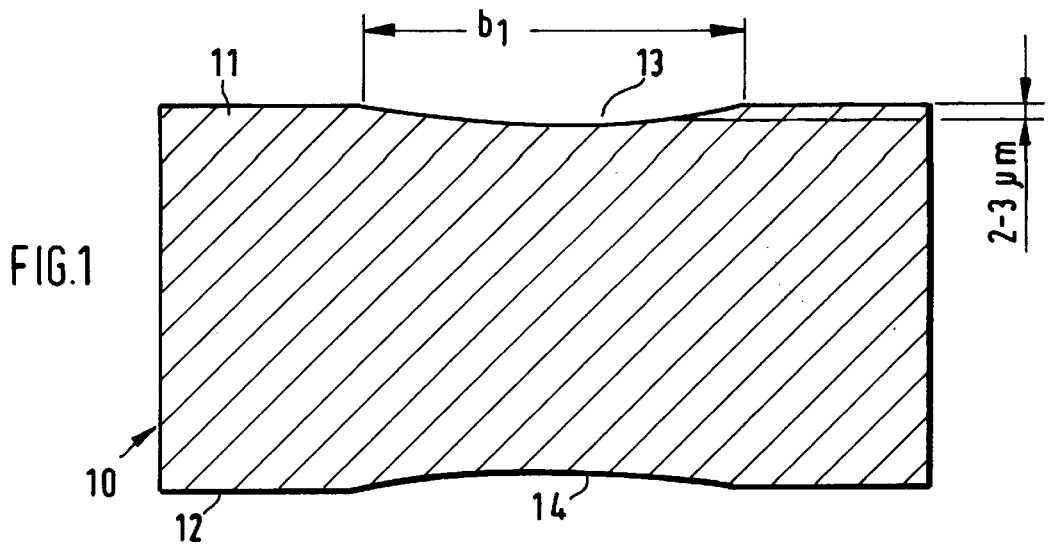
FIG. 1 shows a cross-sectional view of the piston ring according to the invention.

Referring now in detail to the drawings and, in particular, FIG. 1, there is shown a piston ring 10 having a top flank 11 and a bottom flank 12. Flank 11 has a concave indentation 13 and flank 12 has a concave indentation 14. Indentations 13 and 14 have widths denoted as $b_1$.

Figure 2:
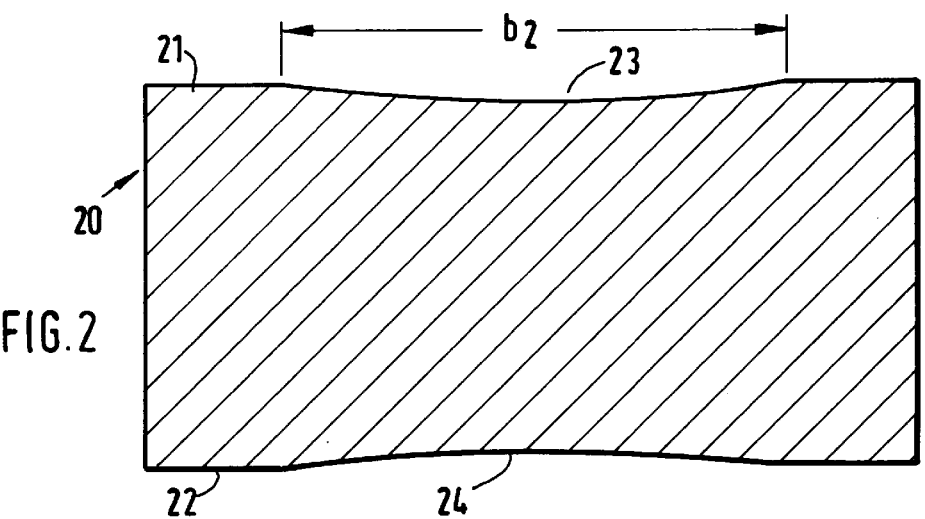
FIG. 2 shows a cross-sectional view of a second embodiment of the piston ring according to the invention.

FIG. 2 shows a piston ring 20 having a top flank 21 and a bottom flank 22. Flank 21 has a concave indentation 23 and flank 22 has a concave indentation 24. Indentations 23 and 24 have widths denoted as $b_2$.

Figure 3:
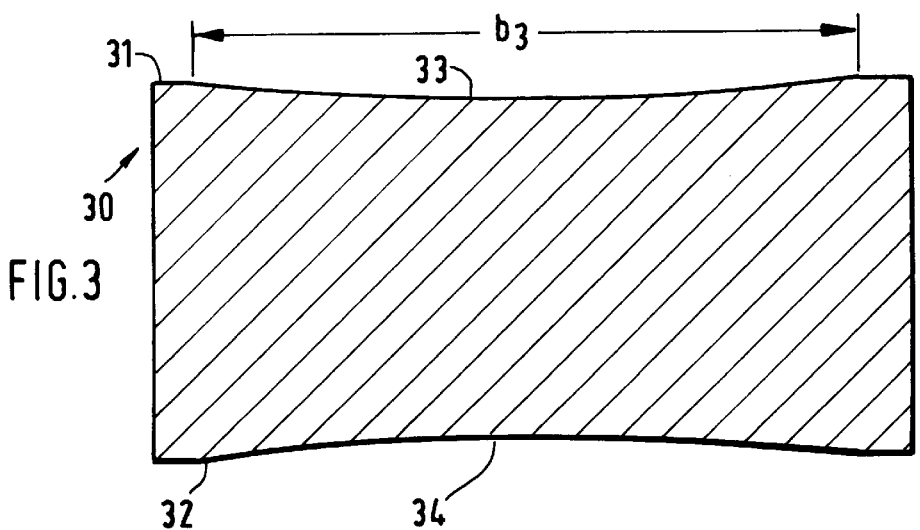
FIG. 3 shows a cross-sectional view of a third embodiment of the piston ring according to the invention.

FIG. 3 shows a piston ring 30 having a top flank 31 and a bottom flank 32. Flank 31 has a concave indentation 33 and flank 32 has a concave indentation 34. Indentations 33 and 34 have widths denoted as $b_3$.

The depths of indentations 13, 14, 23, 24, 33 and 34 are all approximately 2 to 3 $\mu$m.

Figure 4:
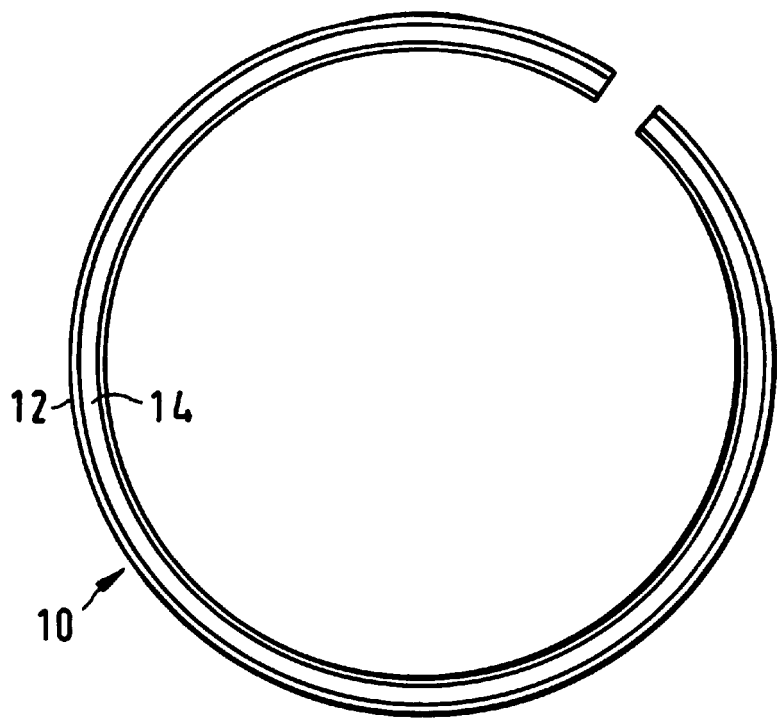
FIG. 4 shows a bottom view of yet another embodiment of the piston ring shown in FIG. 1.

FIG. 4 shows a bottom view of the piston ring 10 according to the invention, showing the indentation 14 extending around the entire circumference of flank surface 12.

Figure 5:
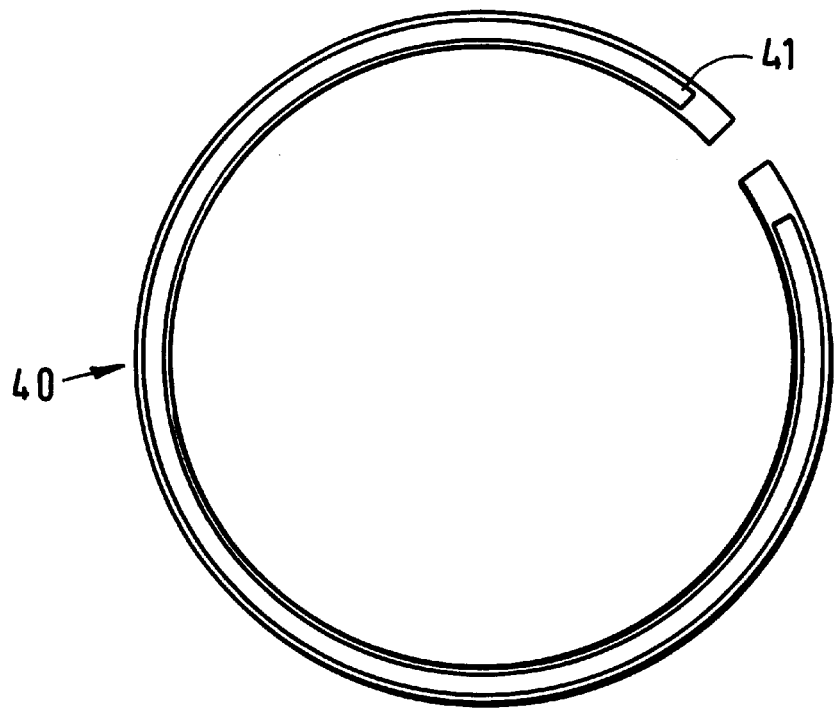
FIG. 5 shows a bottom view of yet another embodiment of the piston ring according to the invention.

FIG. 5 shows a piston ring 40 according to the invention in which indentation 41 is segmented so that it extends only a portion of the way around the circumference of the piston ring.

The design of the piston ring according to the present invention offers major advantages, especially when used in conjunction with aluminum pistons. However, its use in not limited to aluminum pistons.

Accordingly, while only a few embodiments of the present invention have been shown and described, it is obvious that many changes and modifications may be made thereunto without departing from the spirit and scope of the invention.

What is claimed is:

1. A nitrated piston ring for the piston of an internal combustion engine, said ring having a flank surface facing away from combustion pressure, comprising a flat indentation having a depth about 0.5 to 5 $\mu$m forming a lubricant reservoir, said indentation extending circumferentially around the flank surface in the center of the flank surface, wherein said lubricant reservoir prevents formation of prevents aluminum plating on the piston ring without the use of additional coating layers.

2. The piston ring according to claim 1, wherein the indentation has a depth of from about 2 to 3 $\mu$m.

3. The piston ring according to claim 1, wherein the indentation extends around the entire circumference of the flank surface.

4. The piston ring according to claim 1, wherein the indentation covers a segment of the circumference of the flank surface.

5. The piston ring according to claim 1, wherein the piston ring has a flank surface facing the combustion pressure, said flank surface comprising a flat indentation having a depth of from about 0.5 to 5 $\mu$m.

* * * * *